United States Patent [19]

Miller et al.

[11] 4,130,343

[45] Dec. 19, 1978

[54] COUPLING ARRANGEMENTS BETWEEN A LIGHT-EMITTING DIODE AND AN OPTICAL FIBER WAVEGUIDE AND BETWEEN AN OPTICAL FIBER WAVEGUIDE AND A SEMICONDUCTOR OPTICAL DETECTOR

[75] Inventors: Stewart E. Miller, Locust; Kinichiro Ogawa, Matawan, both of N.J.

[73] Assignee: Bell Telephone Laboratories, Incorporated, Murray Hill, N.J.

[21] Appl. No.: 770,796

[22] Filed: Feb. 22, 1977

[51] Int. Cl.² .............................................. G02B 5/14
[52] U.S. Cl. .............................. 350/96.15; 350/96.20
[58] Field of Search ............ 350/96 C, 96 WG, 96 R; 250/552, 227; 357/17, 18, 19; 331/94.5 H; 362/32

[56] References Cited

U.S. PATENT DOCUMENTS

| | | | |
|---|---|---|---|
| 3,611,359 | 10/1971 | Panerai | 350/96 R X |
| 3,982,123 | 9/1976 | Goell | 250/227 |
| 4,006,964 | 2/1977 | Mohlein et al. | 350/96 C |
| 4,007,978 | 2/1977 | Holton | 350/96 WG |

FOREIGN PATENT DOCUMENTS 607922  9/1948  United Kingdom ..................... 362/32

OTHER PUBLICATIONS

Burrus, C. A., Dawson R. W., "Small-area High-current Density GaAs Electroluminescent Diodes . . . " Applied Physics Letters vol. 17, No. 3, Aug. 1970, pp. 97-99.

L. B. Richards "Photodector as Function Detector" IBM Technical Disclosure Bulletin vol. 13, No. 3, Aug. 1970, pp. 591-592.

*Primary Examiner*—John K. Corbin
*Assistant Examiner*—Rolf Hille
*Attorney, Agent, or Firm*—Stephen M. Gurey

[57] ABSTRACT

A terminating portion of an optical fiber waveguide having a polished beveled end is laterally disposed directly on the light-emitting surface of a light-emitting diode (LED). The light power coupled into the fiber consists of two components: the light power directly coupled into the fiber all along the region of contact between the fiber and the light-emitting surface; and the light power reflected by the beveled end and directed along the fiber axis.

31 Claims, 11 Drawing Figures

COUPLING ARRANGEMENTS BETWEEN A LIGHT-EMITTING DIODE AND AN OPTICAL FIBER WAVEGUIDE AND BETWEEN AN OPTICAL FIBER WAVEGUIDE AND A SEMICONDUCTOR OPTICAL DETECTOR

BACKGROUND OF THE INVENTION

This invention relates to optical fiber waveguides and, more particularly, to the coupling of light power from semiconductor light sources to optical fiber waveguides and to the coupling of light power from optical fiber waveguides to semiconductor optical detectors.

Optical fiber waveguides are likely to find increased use as the medium for the transmission of information signals because of their large signal carrying capabilities. In optical transmission systems, analog or digital information signals modulate the light output of a semiconductor source, such as a laser or a light-emitting diode (LED) and the modulated light power is coupled to the optical fiber waveguide.

In the prior art, coupling between a light-emitting diode and an optical fiber is structurally arranged by disposing the optical fiber on or near the light-emitting area of the light source, such that the central axis of the fiber is perpendicular to the emitting area. This structural arrangement, however, has manufacturing disadvantages. For example, an electrical-to-optical converter will include a ceramic substrate upon which is mounted a light-emitting diode connected to an optical fiber waveguide and an integrated circuit (IC) for driving the LED. When the LED is mounted so that its light-emitting area is parallel to the plane of the substrate, the optical fiber emerges perpendicular to the plane of the substrate which is a disadvantageous arrangement for manufacturing purposes. Alternatively, if the optical fiber waveguide is mounted parallel to the substrate, the LED is mounted perpendicular to the plane of the ceramic substrate. Neither of these prior art arrangements readily lends itself to a compact structural package. In addition, the prior art coupling arrangement lacks strength, since contact between the fiber and LED occurs only at the end of the fiber. Similar structural problems exist in the prior art coupling arrangements between optical fiber waveguides and semiconductor optical detectors.

An object of the present invention is to couple light power from a semiconductor light source into an optical fiber waveguide.

An additional object of the present invention is to couple light power from an optical fiber waveguide into a semi-conductor optical detector.

SUMMARY OF THE INVENTION

In accordance with the present invention, a terminating portion of an optical fiber waveguide having a reflective end thereon is laterally disposed on the light-emitting surface of a semiconductor optical source so that the central axis of the terminating portion is substantially parallel to the emitting surface. The light power coupled into the fiber consists of two components: the light power directly coupled into the fiber all along the region of contact of the fiber and the light-emitting surface; and the light power reflected at the end and directed along the fiber axis. Light power is also coupled from an optical fiber waveguide into a semiconductor optical detector by similarly disposing the end of a fiber having a reflective end thereon directly on the light detecting surface of the optical detector.

In one embodiment the reflective end is a polished bevel on the optical fiber waveguide. In another embodiment, the optical fiber waveguide is inserted into a tubular receptacle having a reflective end thereon and which is filled with a material having an index of refraction to match the optical fiber. A bonding material such as an epoxy having an index of refraction the same as or greater than the index of refraction of the optical fiber waveguide is used to affix the optical fiber waveguide to the semiconductor optical source.

A feature of the present invention is that the coupling efficiency of the arrangement is equivalent to the coupling efficiency of the prior art end-on coupling arrangement.

An additional feature is that the structural arrangement of the present invention is more compact and stronger than the prior art end-on coupling arrangement.

An additional feature is that the present invention is more easily adaptable to manufacturing processes.

DETAILED DESCRIPTION

Figure 1A:
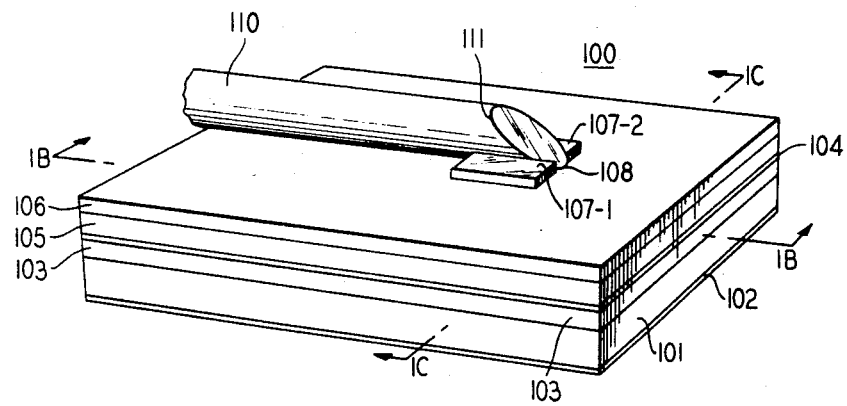
FIG. 1A shows the structural arrangement between a light-emitting diode and an optical fiber waveguide in accordance with the present invention.
Figure 1B:
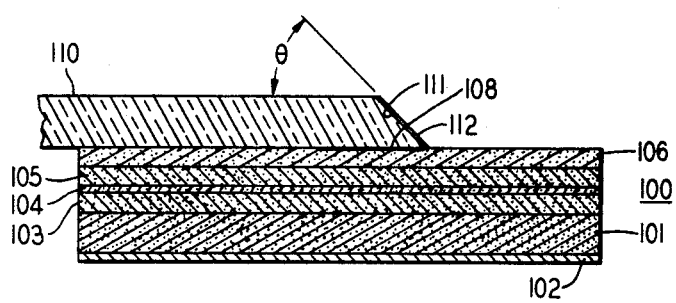
FIGS. 1B and 1C are cross-sectional views of FIG. 1A.
Figure 1C:
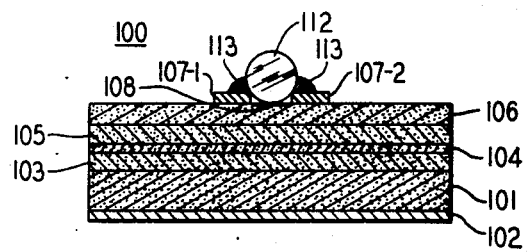

FIGS. 1A, 1B and 1C show an optical fiber waveguide affixed to a light-emitting diode 100 (LED) in a lateral coupling arrangement in accordance with the present invention, where FIGS. 1B and 1C are cross-sectional views of FIG. 1A. The LED 100 is a standard sandwich heterostructure comprising several n and p type semiconductor layers. It includes an n-type gallium arsenide, GaAs, substrate 101 disposed on a metallic conductor 102. An n-type doped layer 103 of gallium aluminum arsenide, GaAlAs, is disposed on the substrate 101. Disposed on layer 103 is the active p-type gallium arsenide layer 104. A p-type gallium aluminum arsenide, GaAlAs layer 105 is disposed on layer 104 and a p$^+$-type gallium arsenide layer 106 is disposed on layer 105. Metallic conductors 107-1 and 107-2 are disposed on layer 106 forming a narrow groove therebetween. Conductors 107-1 and 107-2 are electrically connected together and, when a voltage is impressed between conductors 107-1 and 107-2, and conductor 102, light is emitted from the planar surface area 108 between conductors 107-1 and 107-2.

In accordance with the present invention, light coupling between the light-emitting diode 100 and an optical fiber waveguide 110 is effected by laterally affixing the terminating portion of the optical fiber waveguide 110 on the emitting area 108 of the diode so that the axis of the terminating portion is substantially parallel to the plane of the emitting area 108. The cladding on the terminating portion of the optical fiber waveguide 110 is removed by any number of well-known methods and the end of the optical fiber waveguide is polished to form a bevel 111. As can be noted in FIG. 1B, the beveled fiber end 111 makes an angle θ with emitting area 108. The light rays that emerge from emitting area 108 at an acute angle are coupled directly into the optical fiber waveguide all along the area of contact between the emitting area 108 and the waveguide 110. In addition, the polished beveled fiber end forms a reflector. Thus, the rays that emerge from emitting area 108 from the region under the bevel that are not directly coupled into the fiber, are reflected into the fiber waveguide by bevel 111. In a preferred embodiment, the bevel 111 is coated with a reflective material 112, such as aluminum. In addition, the entire terminating portion of the optical fiber waveguide can be coated with the same reflective material to optically isolate the light coupled into the waveguide. If the terminating portion of the optical fiber is coated with a reflective material, the coating is removed from the circumferential area that is placed in contact with the emitting surface 108. In order to permanently affix optical fiber waveguide 110 to the LED 100, the fiber is bonded to conductor 107 with a material which has a refractive index the same as or greater than the refractive index of the fiber core, such as an epoxy. FIG. 1C shows the epoxy material 113 in contact with the fiber 110 and the conductor 107.

Figure 2A:
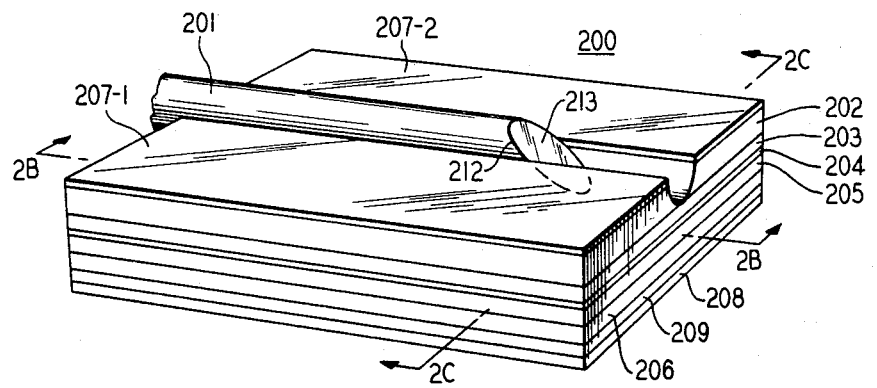
FIG. 2A shows a second embodiment of the coupling arrangement of the present invention.
Figure 2B:
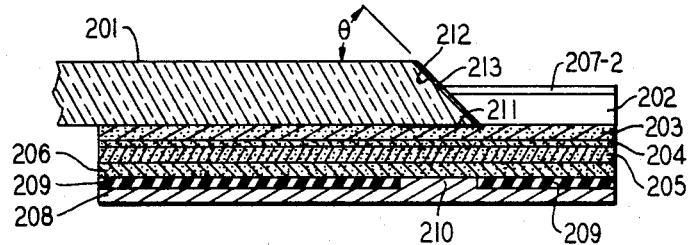
FIGS. 2B and 2C are cross-sectional views of FIG. 2A.
Figure 2C:
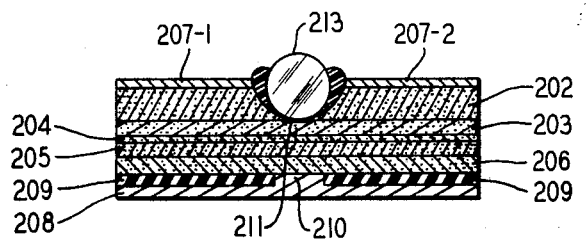

FIGS. 2A, 2B and 2C show a second embodiment of the present invention in which light power is laterally coupled from a Burrus-type light-emitting diode 200 into an optical fiber waveguide 201. FIGS. 2B and 2C are cross-sectional views of FIG. 2A. Rather than etching a circular "well" through the upper semiconductor gallium arsenide layer to the light-emitting surface thereunder, as in the typical Burrus diode, a groove is etched through an n-type gallium arsenide layer 202 to the light-emitting n-type gallium aluminum arsenide GaAlAs layer 203 thereunder. A p-type gallium arsenide layer 204 is disposed under layer 203 and a p-type gallium aluminum arsenide GaAlAs layer 205 is disposed under layer 204. A p$^+$-type gallium arsenide semiconductor layer 206 is disposed under layer 205. A silicon dioxide insulating layer 209 is affixed under layer 206 except for a region 210 directly under the etched groove. A metallic conductor 208 is disposed under layer 209 and within region 210 under the groove. Metallic conductors are affixed on the nonetched surface of layer 202. When a voltage is impressed between conductors 207-1 and 207-2, and conductor 208, light is emitted from the exposed light-emitting area 211 directly above region 210.

The exposed core of the optical fiber waveguide 201 having a polished beveled end 212 is laterally inserted into the groove such that the fiber end is directly over light-emitting area 211. As described in connection with the coupling arrangement in FIG. 1A, the light emitted from the emitting area 211 is directly coupled into the fiber core 201 all along the region of contact between the emitting area and the fiber core. In addition, light rays emitted from the light-emitting area 211 under the bevel that are not directly coupled into fiber 201 are reflected by the beveled fiber end 212 and transmitted along the optical fiber waveguide. As described in connection with the coupling arrangement in FIG. 1A, increased coupling efficiency is obtained by disposing a reflective coating 213, such as aluminum, on the beveled fiber end. The grooved Burrus diode advantageously provides a slot into which the exposed optical fiber core can be readily positioned. Thus, in a manufacturing process, there is minimum difficulty in properly positioning the optical fiber waveguide over the light-emitting area. As can be noted in FIG. 2C, the gap between the fiber core 201 and the groove is filled with a bonding material such as an epoxy having an index of refraction the same or greater than the index of refraction of the fiber core.

Coupling efficiency between the light-emitting diode and the optical fiber waveguide is a function of the bevel angle, the lateral position of the terminating portion of the optical fiber waveguide over the light-emitting area and the rotational position of the terminating portion on the light-emitting area. Maximum direct optical power coupling between the light-emitting surface and the optical fiber waveguide occurs when the entire emitting surface is in contact with the terminating portion of the fiber. Maximum reflective coupling occurs when the beveled fiber end is directly above the emitting area and rotated so that a line perpendicular to the axis of the etched groove is parallel to the plane of the bevel. A theoretical analysis shows maximum reflective light power coupling when the bevel angle is approximately 45° although experimental results show maximum coupling obtained when the bevel angle is 42°.

Figure 3A:
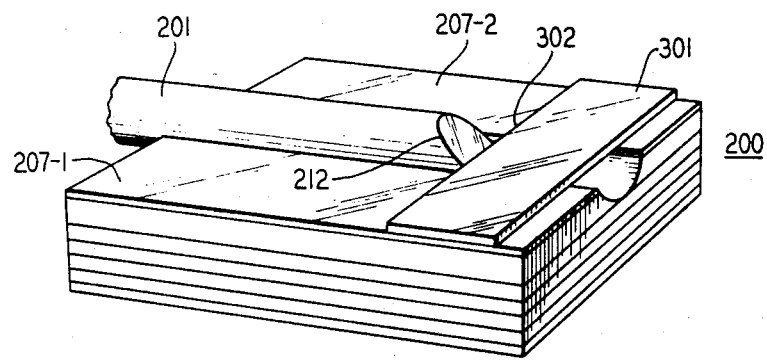
FIGS. 3A, 3B and 3C show modifications of FIG. 2A which include structural apparatus for positioning the optical fiber on the light-emitting surface of an LED for maximum coupling efficiency.
Figure 3B:
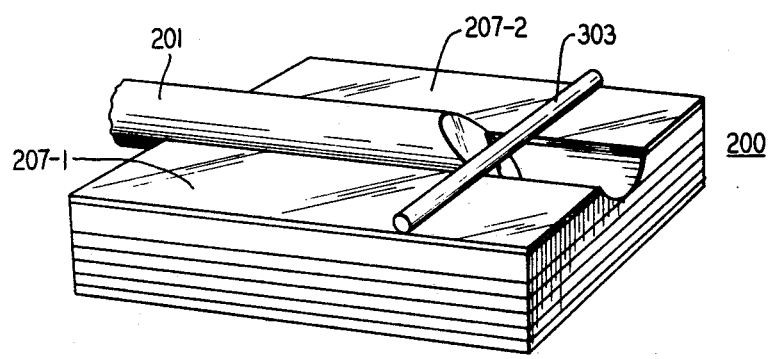
Figure 3C:
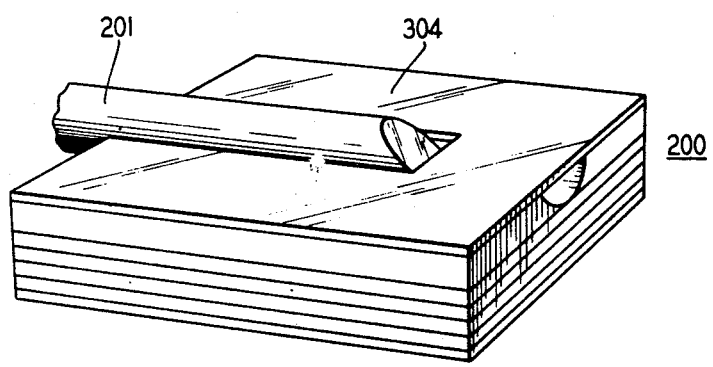

The structure in FIGS. 3A, 3B and 3C are modifications of the structure in FIG. 2A. Each structure has provisions for positioning the fiber directly over the light-emitting area and for orienting the fiber within the grooved Burrus diode at the rotational position giving maximum coupling efficiency. A similar numerical designation is given to the structural elements which are common to FIGS. 2A, 3A, 3B and 3C. In FIG. 3A, a metallic slab 301 is connected between conductors 207-1 and 207-2 so that one edge 302 of the slab 301 is perpendicular to the etched groove and is positioned over the light-emitting area within the groove. Fiber 201 is laterally positioned within the groove until the fiber end makes contact with slab 301 and is rotated within the groove until edge 302 is in contact with the planar bevel surface. In FIG. 3B, a metallic cylindrical rod 303 is disposed perpendicular across the etched groove between the two conductors 207-1 and 207-2 and above the light-emitting surface. Fiber 201 is positioned so that rod 303 is disposed across the planar bevel surface. In FIG. 3C, the two conductors 207-1 and 207-2 are replaced by a unitary U-shaped conducting member 304 which serves the same purpose and function as the metallic slab 301 and the metallic cylindrical rod 302 in FIGS. 3A and 3B, respectively.

Figure 4A:
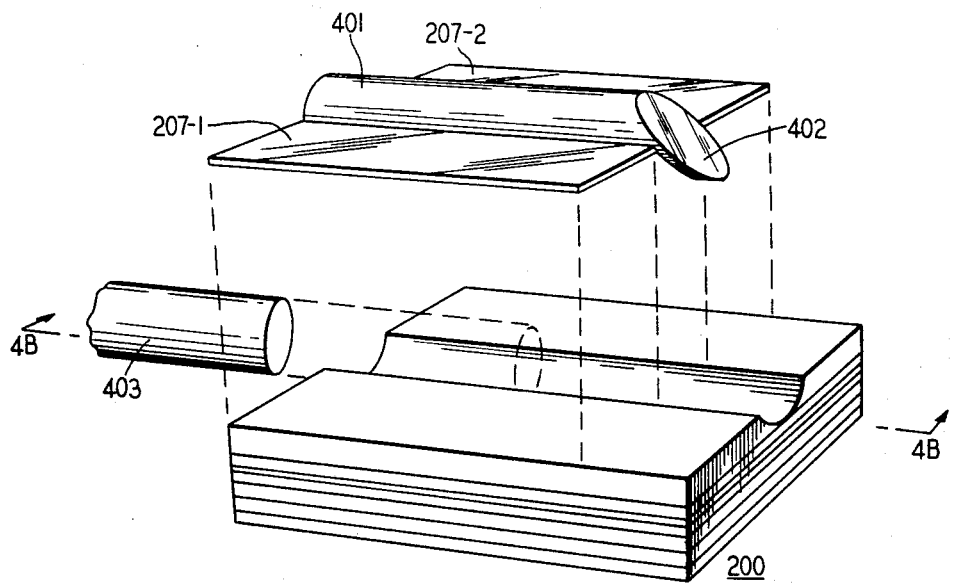
FIG. 4A is an embodiment of the present invention which does not require a bevel at the end of the optical fiber waveguide.
Figure 4B:
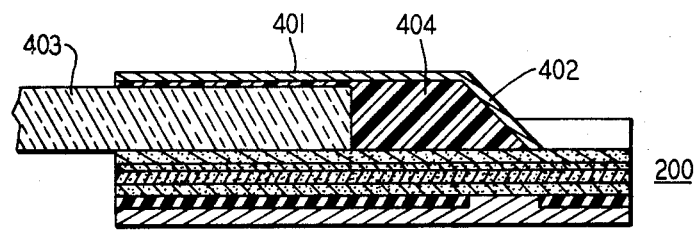
FIG. 4B is a cross-sectional view of FIG. 4A.

FIG. 4A shows an embodiment of the present invention which does not require a bevel at the end of the optical fiber waveguide. FIG. 4B is a cross-sectional view of FIG. 4A. In FIG. 4A, a metal tube 401 and conductors 207-1 and 207-2 form a receptacle over the light-emitting surface within the groove of Burrus diode 200. A planar reflective member 402 is disposed at one end of tube 401 over the light-emitting surface of the light-emitting diode 200. Member 402 makes an acute, preferably 45°, angle with the light-emitting surface. The other end of tube 401 forms an orifice with the groove to permit reception of an exposed optical fiber waveguide core 403 therein. The interior of the tube 401 is filled with an epoxy matching material 404 having the same refractive index as the refractive index of optical fiber core 403. Metal tube 401 with its beveled reflective end 402 forms an optical waveguide from material 404 which directs light emitted from the light-emitting surface into the optical fiber waveguide 403.

All of the aforedescribed structural arrangements for laterally coupling a light-emitting diode and an optical fiber waveguide having coupling efficiencies equal to that obtained with the prior art end-on coupling. The lateral coupling arrangement of the present invention, however, provides a stronger and more compact structure. Although the structural arrangements have been described in connection with a coupling light emitted from an LED, the principles of the present invention can be equally employed to couple light from a semiconductor laser source to an optical fiber waveguide.

As is readily apparent to one skilled in the art, the principles of the present invention can also be applied to a coupling arrangement between an optical fiber waveguide and a semiconductor optical detector, as for example, a photodiode. In such an embodiment, a terminating portion of an optical fiber having a beveled end thereon is disposed on the planar detecting surface of the optical detector such that the axis of the fiber is substantially parallel to the axis of the detecting surface. Light power transmitted in the optical fiber is coupled into the detector directly along the region of contact between the fiber and the detecting surface and by reflection at the beveled end. The embodiment of the present invention illustrated in FIG. 1A could be used to illustrate this application of the invention wherein LED 100 is replaced by a semiconductor optical detector, as for example, a simple silicon backbiased PN junction. The optical fiber waveguide would be bonded to the surface of the detector with an epoxy having a refractive index between the refractive indices of the fiber and the semiconductor detector. The embodiment of the present invention illustrated in FIG. 4A could also be modified to couple light from an optical fiber waveguide into a photodiode. In such a modification, a tubular receptacle having a planar reflective member at one end is disposed on the detecting surface of a photodiode in a manner similar to the arrangement in FIG. 4A. When the tubular receptacle is filled with material having the same index of refraction as the optical fiber and the optical fiber inserted within the receptacle, light is coupled from the optical fiber to the detecting surface of the photodiode. The structural modifications illustrated in FIGS. 3A, 3B and 3C could also be modified to orient the fiber on the detecting surface for maximum coupling efficiency.

The above-described arrangements are illustrative of the application and principles of the invention. Other embodiments may be devised by those skilled in the art without departing from the spirit and scope of the invention.

What is claimed is:

1. In combination, a semiconductor optical source having a light-emitting surface, an optical fiber waveguide having a central axis, a terminating portion of said fiber waveguide being affixed to said surface such that the axis of said terminating portion is substantially parallel to said surface so that a portion of the light power radiated from said surface is directly refracted into said optical fiber waveguide, and means at the end of said terminating portion for reflecting another portion of the light power radiated from said surface into said optical fiber waveguide.

2. The combination in accordance with claim 1 wherein said semiconductor optical source is a light-emitting diode.

3. The combination in accordance with claim 2 wherein said terminating portion is affixed to said light-emitting surface with a material having an index of refraction the same as or greater than the index of refraction of said optical fiber waveguide.

4. The combination in accordance with claim 3 wherein said material is epoxy.

5. The combination in accordance with claim 2 wherein the reflecting means is a polished bevel at the end of said optical fiber waveguide.

6. The combination in accordance with claim 5 wherein said polished bevel is coated with a reflective metallic material.

7. A combination in accordance with claim 6 which further includes means for orienting the rotational position and the lateral position of the beveled end of said optical fiber waveguide on said light-emitting surface.

8. The combination in accordance with claim 5 wherein said beveled optical fiber waveguide end makes an angle of 45 degrees with said light-emitting surface.

9. The combination in accordance with claim 2 wherein said light-emitting surface is within a groove etched in said light-emitting diode, said terminating portion of said fiber waveguide being disposed within said groove.

10. A combination in accordance with claim 9 which further includes means for orienting the rotational position and the lateral position of the beveled end of said optical fiber waveguide on said light-emitting surface.

11. The combination in accordance with claim 10 wherein the orienting means is a member disposed across said groove.

12. In combination, a semiconductor optical source having a light-emitting surface, receptacle means attached to said semiconductor optical source forming a tubular region between said means and said source having a central axis substantially parallel to said light-emitting surface, said receptacle means having two ends, a first end being adapted to receive a terminating end of an optical fiber waveguide, and the second end including means for reflecting light power radiated from said surface towards said first end.

13. The combination in accordance with claim 12 wherein said semiconductor optical source is a light-emitting diode.

14. The combination in accordance with claim 13 further including light refractive material disposed within said tubular region.

15. The combination in accordance with claim 14 wherein said light refractive material has substantially the same index of refraction as an optical fiber waveguide.

16. The combination in accordance with claim 15 wherein said means for reflecting light is a planar reflective surface disposed at an acute angle to said light-emitting surface.

17. A combination in accordance with claim 15 which further includes an optical fiber waveguide having a terminating end thereof disposed within said receptacle means through said first end.

18. In combination, a semiconductor optical detector having a detecting surface, an optical fiber waveguide having a central axis, a terminating portion of said fiber waveguide being affixed to said surface such that the axis of said terminating portion is substantially parallel to said surface so that a portion of the light power transmitted in said optical fiber waveguide is directly refracted into said detecting surface, and means at the end of said terminating portion for reflecting another portion of the light power from said optical fiber waveguide into said detecting surface.

19. The combination in accordance with claim 18 wherein said semiconductor optical detector is a photodiode.

20. The combination in accordance with claim 19 wherein said terminating portion is affixed to said light-emitting surface with a material having an index of refraction the same as the index of refraction of said semiconductor optical detector.

21. The combination in accordance with claim 20 wherein said material is epoxy.

22. The combination in accordance with claim 19 wherein the reflecting means is a polished bevel at the end of said optical fiber waveguide.

23. The combination in accordance with claim 22 wherein said polished bevel is coated with a reflective metallic material.

24. A combination in accordance with claim 23 which further includes means for orienting the rotational position and the lateral position of the beveled end of said optical fiber waveguide on said light-emitting surface.

25. The combination in accordance with claim 22 wherein said beveled optical fiber waveguide end makes an angle of 45° with said light-emitting surface.

26. In combination, a semiconductor optical detector having a light-detecting surface, receptacle means attached to said semiconductor optical detector forming a tubular region between said means and said detector having a central axis substantially parallel to said light-detecting surface, said receptacle means having two ends, a first end being adapted to receive a terminating end of an optical fiber waveguide, and the second end including means for reflecting light power radiated from said first end into said surface.

27. The combination in accordance with claim 26 wherein said semiconductor optical source is a photodiode.

28. The combination in accordance with claim 27 further including light refractive material disposed within said tubular region.

29. The combination in accordance with claim 28 wherein said light refractive material has substantially the same index of refraction as an optical fiber waveguide.

30. The combination in accordance with claim 29 wherein said means for reflecting light is a planar reflective surface disposed at an acute angle to said light-detecting surface.

31. A combination in accordance with claim 29 which further includes an optical fiber waveguide having a terminating end thereof disposed within said receptacle means through said first end.

* * * * *